United States Patent [19]
Moen

[11] 3,726,314
[45] Apr. 10, 1973

[54] VALVE SEAL CONSTRUCTION
[76] Inventor: Alfred M. Moen, 25 Lakeview Drive, Grafton, Ohio
[22] Filed: Aug. 18, 1971
[21] Appl. No.: 172,776

Related U.S. Application Data
[63] Continuation-in-part of Ser. No. 147,357, May 27, 1971.

[52] U.S. Cl. ............................................137/625.41
[51] Int. Cl. ..............................................F16k 11/00
[58] Field of Search.....................137/625.41, 625.4, 137/625.42, 625.46, 625.47; 251/182, 183

[56] References Cited

UNITED STATES PATENTS

| | | |
|---|---|---|
| 3,548,875 | 12/1970 | Lagarelli..................131/625.41 X |
| 3,395,889 | 8/1968 | Chovan........................251/183 X |
| 2,545,220 | 3/1951 | Wolcott, Jr....................251/182 X |
| 3,130,952 | 4/1964 | Meyer............................251/181 X |
| 3,241,570 | 3/1966 | Mueller.....................137/625.47 X |
| 3,460,571 | 8/1969 | Moen............................137/625.4 X |
| 3,542,072 | 11/1970 | Harris, Sr. et al. ..............137/625.47 |
| 3,582,040 | 6/1971 | Gutierrez........................251/182 X |

Primary Examiner—Samuel Scott
Attorney—Parker, Plyer & McEachran

[57] ABSTRACT

A valve seal construction for use in connection with a valve comprising a body member having inlet passages terminating on the exterior thereof, and a sleeve member movable relative to the body member to control the fluid discharged from the valve. The seal construction includes a port portion in sealing contact with the sleeve and a body portion surrounding the port portion and positioned against the exterior of the body member.

15 Claims, 11 Drawing Figures

PATENTED APR 10 1973 3,726,314

INVENTOR.
Alfred M. Moen
BY Parker, Markey & Plyer
Attorneys.

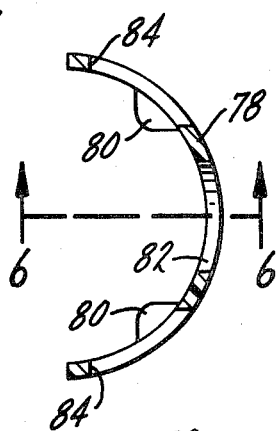
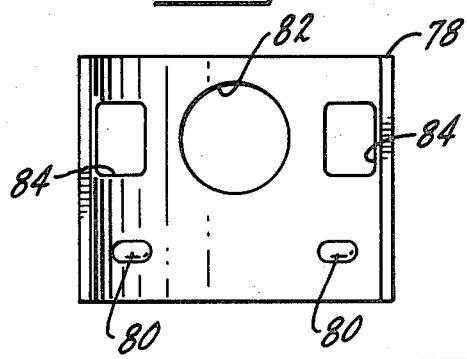
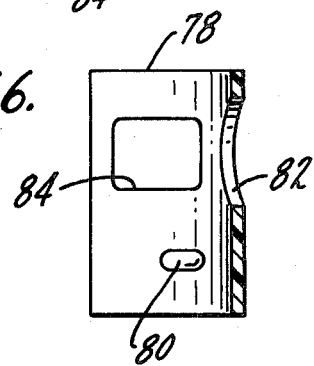
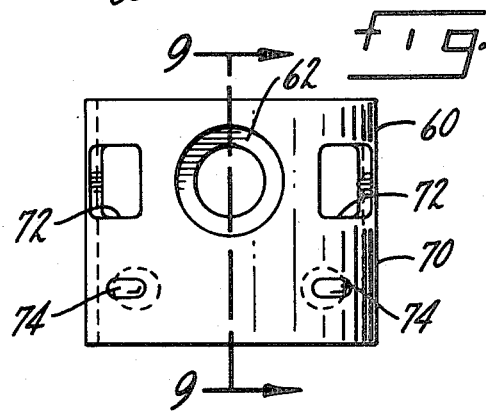
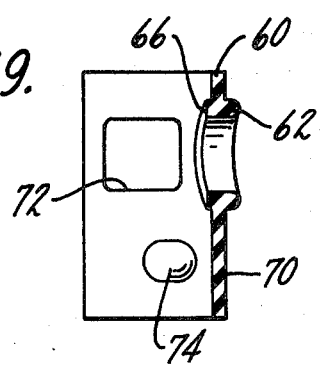
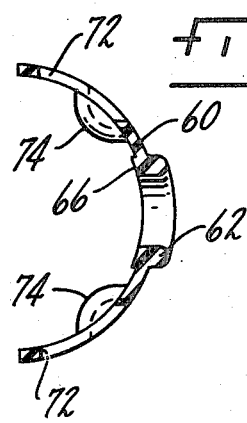
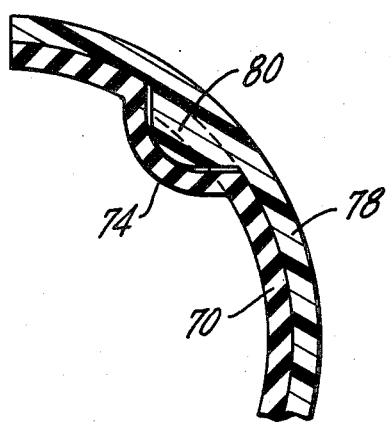
INVENTOR.
Alfred M. Moen
BY Parker, Markey & Plyer
Attorneys.

VALVE SEAL CONSTRUCTION

This application is a continuation in part of my copending application Ser. No. 147,357 filed May 27, 1971 titled "Bottom OUtlet Grommet Mixing Valve."

SUMMARY OF THE INVENTION

The present invention relates to a valve seal construction and particularly to a seal construction including a port portion adapted to be in sealing contact with the sleeve and a body portion adapted to be positioned against the body member within the sleeve.

One purpose is a valve seal construction which is simple in construction and reliably operable.

Another purpose is a valve seal construction which is firmly anchored upon a body member and provides sealing contact with a sleeve movable about and on the body member.

Another purpose is a valve seal which may be formed in two parts and has a seal support positioned about it.

Another purpose is a valve seal construction usable in connection with the faucet shown in my prior U.S. Pat. No. 3,460,571.

Another purpose is a valve seal construction comprising a grommet-like seal having a supporting body portion and a seal support positioned about the body portion and generally co-extensive with it.

Other purposes will appear in the ensuing specification, drawings and claims.

BRIEF DESCRIPTION OF THE DRAWINGS

The invention is illustrated diagrammatically in the following drawings wherein:

FIG. 5 is a top plan view in section of one of the seal supports, FIG. 6 is a section along plane 6—6 of FIG. 5, FIG. 7 is a side elevation of the seal support illustrated in FIGS. 5 and 6, FIG. 8 is a side elevation of one of the seal parts forming the seal construction disclosed herein, FIG. 9 is a section along plane 9—9 of FIG. 8, FIG. 10 is a top plan view of the seal part of FIGS. 8 and 9, and FIG. 11 is an enlarged partial section illustrating the interlock between the seal and seal support.

DESCRIPTION OF THE PREFERRED EMBODIMENT

The present invention has application in the field of mixing faucets which control the volume and temperature of a water discharge. The principles disclosed herein should not be limited to such an application, as they have substantially wider use.

Figure 1:
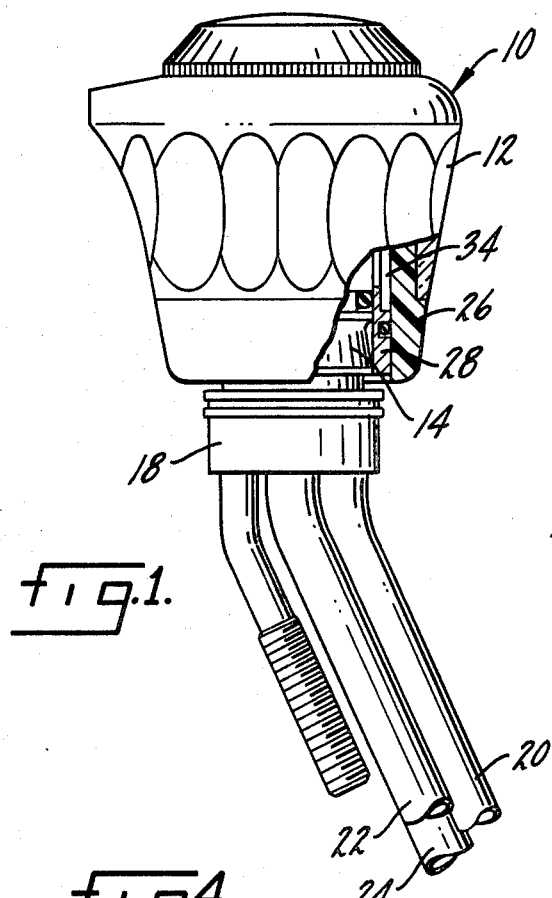
FIG. 1 is a side view of a valve of the type described.

In FIG. 1, a handle is indicated generally at 10 and may have a gripping area 12. Positioned within the handle is a body member indicated generally at 14 and the handle may be suitably attached to an upper projection 16 on the body member. For example, the handle may be attached to the body member in one of the various constructions illustrated in my co-pending application Ser. No. 875,042 filed Nov. 10, 1969, now U.S. Pat. No. 3,592,229, issued July 13, 1971. The body member 14 may have a base 18 into which three conduits 20, 22 and 24 extend. Conduits 22 and 24 are the hot and cold water inlets and conduit 20 carries the discharge from the valve to a nearby spout or to a shower-tub combination, depending upon the particular use of the faucet-type mixing valve shown.

The handle member 10, which may be rotated and reciprocated on the body member as described in my above-mentioned patent, includes an outer handle 26 and an inner sleeve 28. Upper and lower grooves 30 and 32 in the exterior of the sleeve 28 hold seal rings to form the upper and lower seals of a mixing chamber 34 defined by an inner circumferentially extending groove 35 in the sleeve and the interior surface of the handle 26. There may be a plurality of inlet ports in the sleeve 28, one of which is indicated at 36, opening into the mixing chamber 34. Although the seal construction described hereinafter is illustrated in connection with the faucet shown in the above-mentioned patent, it has wider application in the faucet field.

Figure 4:
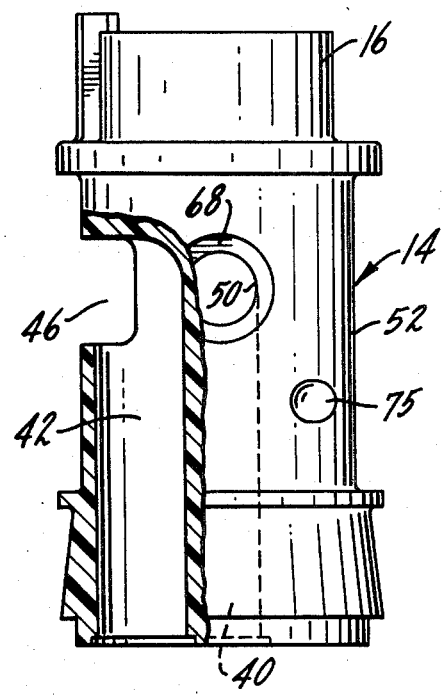
FIG. 4 is a side elevation, with portions cut away, of the body member illustrated in the construction of FIG. 2.
Figure 3:
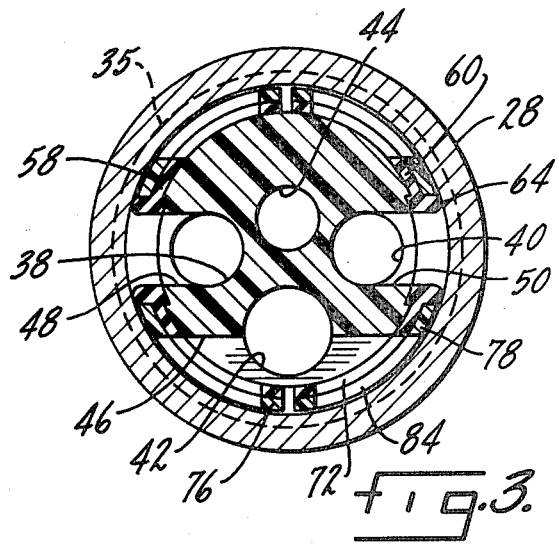
FIG. 3 is a section along plane 3—3 of FIG. 2.

The body member 14 includes a pair of inlet passages shown in FIG. 3 and designated at 38 and 40. An outlet passage is designated at 42. Passage 44 may be used in mounting the body member to the underlying base and in such instance will contain a mounting stud not shown. The outlet passage 42 is illustrated in FIG. 4 with the inlet passages being indicated in phantom lines. The outlet passage 42 is in communication with a slot or the like 46, which extends across the body member and can be placed selectively in communication with the sleeve discharge ports communicating with the mixing chamber 34 during operation of the valve.

Figure 2:
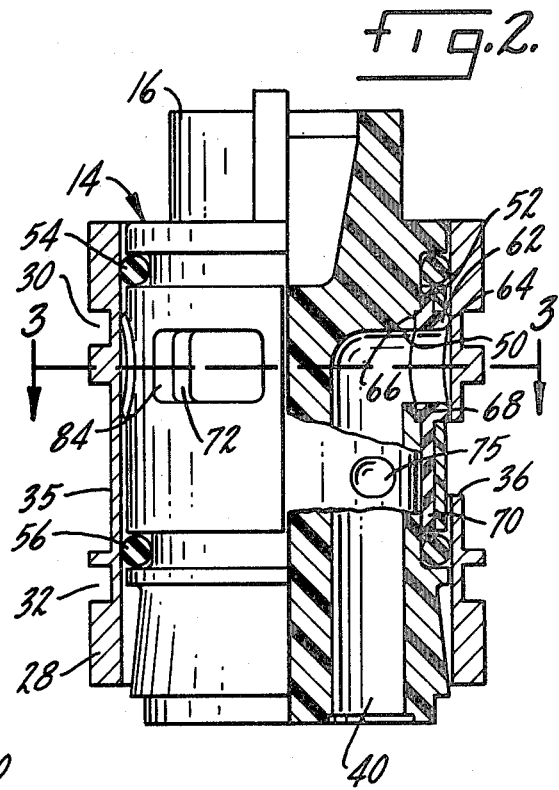
FIG. 2 is an enlarged partial axial section of the valve illustrated in FIG. 1.

Each of the inlet passages 38 and 40 have generally radially extending passage terminations indicated at 48 and 50, such terminations ending on the exterior surface of the body member. As illustrated particularly in FIG. 2, there is a circumferential recess 52 extending about the body member in the area of the passage terminations 48 and 50. Positioned within the recess 52, at its opposite ends, are seal rings 54 and 56, such seal rings sealing the opposite ends of the recess against the interior surface of the sleeve 28 as illustrated in FIG. 2. Positioned between the seal rings 54 and 56 are a pair of seal parts or seal halves indicated at 58 and 60 and shown particularly in FIGS. 3 and 8–10. Each of the seal parts contain a port seal portion 62, the exterior rim of which is in sealing contact with the interior of the sleeve 28, as indicated at 64. The port seal portions 62 extend both outwardly, toward the sleeve 28, and inwardly toward the body member and have an inwardly-directed projection 66, annular in form, which sits within a groove 68 formed at the end of the passage terminations 48 and 50. The inward projections 66 are effective to anchor the seal parts to the body member and also provide a seal the passage termination to prevent any leakage at this point. Surrounding each of the port seal portions 62 are body portions 70 which, as illustrated in FIG. 3, extend generally halfway about the body member so that the total of the two seal parts encloses generally the entire body member. In addition to the port seal portions 62, which define water passages conveying water to the sleeve 28, each of the seal parts 58 and 60 have openings 72 which register with the cutaway portion 46 on the body member. Thus, water after it has been mixed in the mixing chamber 34, will be conveyed inwardly through the opening 72 toward the water discharge 42. Each of the seal parts 58 and 60 have a pair of inwardly-directed projections 74, as illustrated particularly in FIG. 11. The projections 74 will fit within mating indentations 75 in the exterior of the body member to anchor the seal parts upon the body member.

Positioned about each of the seal parts 58 and 60 are seal support members 76 and 78. The seal support members 76 and 78 may be formed of plastic or some other suitable generally rigid material so that they will provide support for the body portion of the seal member. The interior surfaces of the seal support 76 and 78 have inwardly-directed projections 80 which mate with the projections 74 on the seal parts to thus anchor the seal supports to the seal, with the entire combination then being anchored to the body member. The seal supports 76 and 78 each have openings 82 for positioning of the port seal portions 62 and openings 84 which are in register with the openings 72 in the seal parts, again for passage of water after it has been through the mixing chamber 34. The seal supports are generally co-extensive with the seal parts and provide generally complete support over the body portions of the seal parts to thus provide the degree of rigidity necessary to prevent the seals from being distorted in use.

Of importance in the invention is the fact that the seal members not only seal against the sleeve forming a part of the handle, but they also seal against the passage terminations. The body portions of the seal parts extend generally about the entire body to thus provide a complete seal for both the inlet and discharge areas of the body member. The body portions of the seal members are important, as are the seal supports, as they prevent the seal from being distorted in use and prevent the seal from being blown out of the discharge passage, which can happen with sudden changes in water pressure in the valve. The seal supports and the seal ports are anchored to the body member, not only by the inwardly-extending projections 66 of the port seal portions 62, but also by the mating projections 74 and 80 on the seal support and the seal members.

In operation, rotation and reciprocation of the handle will be effective to control the volume and temperature of water passing from the inlet passages, through the mixing chamber 34 and then back to the discharge passage 42. The valve may be used in a variety of faucet applications, for example in the kitchen, lavatory or shower-tub combination.

Whereas the preferred form of the invention has been shown and described herein, it should be realized that there may be many modifications, substitutions and alterations thereto.

I claim:

1. In a fluid mixing valve, a body member having a plurality of inlet passages terminating on the exterior thereof, means movable on said body member and including a mixing chamber, entrance ports into said chamber in said movable means, outlet means in communication with said mixing chamber, selective movement of said movable means relative to said body member placing said inlet passages into selective communication with said mixing chamber, sealing means associated with the termination of each of said inlet passages and including a port portion in contact with said movable means and a body portion surrounding each port portion and positioned against the exterior of said body member, each body portion extending a substantial distance from its associated port portion.

2. The structure of claim 1 further characterized in that said body portions extend substantially about said body member.

3. The structure of claim 1 further characterized in that each port portion extends inwardly into a passage termination.

4. The structure of claim 1 further characterized by and including means on the body portions for anchoring said sealing means to the exterior of said body member.

5. The structure of claim 4 further characterized in that said anchoring means includes inwardly-directed projections on the body portions and mating indentations on the exterior of said body member.

6. The structure of claim 1 further characterized in that said body portions extend circumferentially about the body member, each of said port portions being in contact with said movable means and extending inwardly into a passage termination, and means for anchoring said sealing means upon the exterior of said body member.

7. The structure of claim 6 further characterized by and including a circumferentially extending recess on said body member, the body portions of said sealing means being positioned within said recess.

8. The structure of claim 1 further characterized by and including a seal support positioned about said sealing means.

9. The structure of claim 8 further characterized by and including openings in the seal support, said openings being in register with the port portions of the sealing means with said port portions passing through said seal support openings.

10. The structure of claim 8 further characterized in that said sealing means includes a pair of sealing members positioned about the exterior of said body member, with each sealing member including a port portion and a body portion, and a pair of seal support members positioned outside of each of said sealing members.

11. The structure of claim 10 further characterized in that said seal supports and body portions are generally coextensive.

12. The structure of claim 10 further characterized by and including means for anchoring said seal supports to the sealing members.

13. The structure of claim 12 further characterized by and including means for anchoring the combination of the sealing members and the seal supports to the exterior of the body member.

14. A seal for use in a valve member having a body member with passage terminations on the exterior thereof, and a sleeve member movable relative to the body member, said seal including a port portion in sealing contact with the sleeve and having a part thereof positioned within a passage termination, and a body portion surrounding said port portion and adapted to be positioned against the body member, said body portion extending a substantial distance from said port portion.

15. The seal construction of claim 14 further characterized in that said port portion extends outwardly from opposite sides of said body portion.

* * * * *